(12) United States Patent
Tang

(10) Patent No.: US 11,277,234 B2
(45) Date of Patent: Mar. 15, 2022

(54) DATA TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/618,796

(22) PCT Filed: Jun. 8, 2017

(86) PCT No.: PCT/CN2017/087630
§ 371 (c)(1),
(2) Date: Dec. 2, 2019

(87) PCT Pub. No.: WO2018/223352
PCT Pub. Date: Dec. 13, 2018

(65) Prior Publication Data
US 2020/0136774 A1  Apr. 30, 2020

(51) Int. Cl.
*H04L 27/26* (2006.01)
*H04L 5/00* (2006.01)
(Continued)

(52) U.S. Cl.
CPC .......... *H04L 5/0046* (2013.01); *H04L 1/1614* (2013.01); *H04W 72/042* (2013.01); *H04W 76/27* (2018.02); *H04W 80/02* (2013.01)

(58) Field of Classification Search
None
See application file for complete search history.

(56) References Cited

U.S. PATENT DOCUMENTS

| 2012/0099544 A1 | 4/2012 | Pajukoski et al. |
| 2012/0115526 A1 | 5/2012 | Ogawa et al. |

(Continued)

FOREIGN PATENT DOCUMENTS

| CN | 101378289 | 3/2009 |
| CN | 102340875 | 2/2012 |

(Continued)

OTHER PUBLICATIONS

SIPO, First Office Action for CN Application No. 201911330503.4, dated Nov. 3, 2020.
(Continued)

*Primary Examiner* — Sithu Ko
(74) *Attorney, Agent, or Firm* — Hodgson Russ LLP

(57) ABSTRACT

Disclosed are a data transmission method, a terminal device and a network device. The method includes: determining, by a terminal device, a Resource Block Group (RBG) size corresponding to a transmission bandwidth used by the terminal device according to the transmission bandwidth and a corresponding relationship between the transmission bandwidth and the RBG size; receiving, by the terminal device, a bitmap borne in downlink control information sent by a network device, the bitmap including M bits and being a positive integer; determining, by the terminal device, a target RBG for data transmission from N RBGs within the transmission bandwidth according to values on N bits from the M bits, N being determined according to the transmission bandwidth and the RBG size and being a positive integer less than or equal to M; and transmitting, by the terminal device, the data with the network device on the target RBG.

20 Claims, 5 Drawing Sheets

(51) Int. Cl.
*H04W 76/27* (2018.01)
*H04L 1/16* (2006.01)
*H04W 72/04* (2009.01)
*H04W 80/02* (2009.01)

(56) References Cited

U.S. PATENT DOCUMENTS

| | | |
|---|---|---|
| 2012/0275428 A1 | 11/2012 | Feng et al. |
| 2013/0034062 A1 | 2/2013 | Seo et al. |
| 2013/0128852 A1* | 5/2013 | Xue .................. H04W 72/1252 370/329 |
| 2013/0155996 A1* | 6/2013 | Horiuchi ........... H04W 72/0406 370/329 |
| 2013/0176952 A1* | 7/2013 | Shin .................... H04W 72/042 370/329 |
| 2014/0029537 A1* | 1/2014 | Golitschek Edler von Elbwart ... H04L 5/001 370/329 |
| 2014/0153524 A1* | 6/2014 | Xu ........................ H04L 5/0094 370/329 |
| 2014/0204879 A1* | 7/2014 | Yang .................... H04L 5/0044 370/329 |
| 2015/0289274 A1 | 10/2015 | Papasakellariou et al. |
| 2016/0262165 A1 | 9/2016 | Lee et al. |
| 2017/0215170 A1* | 7/2017 | Islam .................. H04L 27/2601 |
| 2018/0048435 A1* | 2/2018 | Islam .................... H04L 5/0007 |
| 2018/0049203 A1* | 2/2018 | Xue .................... H04L 5/0053 |
| 2018/0092084 A1* | 3/2018 | Yun .................... H04L 5/0005 |
| 2018/0227101 A1* | 8/2018 | Park ...................... H04L 5/0023 |
| 2018/0324760 A1* | 11/2018 | Yuk ...................... H04L 5/0044 |
| 2019/0289598 A1* | 9/2019 | Shimezawa ....... H04L 27/26025 |
| 2019/0349896 A1* | 11/2019 | Yu ........................ H04W 72/042 |
| 2019/0349943 A1* | 11/2019 | Wu .................... H04W 72/0453 |
| 2020/0059912 A1* | 2/2020 | Shen .................. H04W 72/044 |

FOREIGN PATENT DOCUMENTS

| | | |
|---|---|---|
| CN | 102726109 | 10/2012 |
| CN | 103548407 | 1/2014 |
| CN | 103733560 | 4/2014 |
| CN | 105723773 | 6/2016 |
| CN | 106028454 | 10/2016 |
| CN | 106162889 | 11/2016 |
| EP | 2503835 | 9/2012 |
| EP | 2597917 | 5/2013 |
| EP | 3157188 | 4/2017 |
| RU | 2577318 | 3/2016 |

OTHER PUBLICATIONS

WIPO, ISR for PCT/CN2017/087630, dated Feb. 24, 2018.
3GPP TS 36.213 V8.8.0: "3rd Generation Partnership Project; Technical Specification Group Radio Access Network; Evolved Universal Terrestrial Radio Access (E-UTRA); Physical layer procedures (Release 8)," Sep. 2009, 77 pages.
EPO, Office Action for EP Application No. 17912699.0, dated Apr. 3, 2020.
3GPP Organizational Partners, 3GPP TSG-RAN E-UTRA Physical layer procedures, Release 14, 2017, 454 pages.
Federal Service for Intellectual Property (Rospatent), Notice of Allowance for RU Application No. 2019143100/07, dated Aug. 18, 2020.
MCC Report, "Final Report of 3GPP TSG RAN WG1 #89 v1.0.0," 3GPP TSG RAN WG1 Meeting #90, R1-1712031, Aug. 21, 2017, 164 pages.
INAPI, Office Action for CL Application No. 201903581, dated May 20, 2021.
JPO, Office Action for JP Application No. 2019567322, dated May 18, 2021.
ISDEC, Office Action for CA Application No. 3066293, dated Feb. 11, 2021.
IPI, Office Action for IN Application No. 201917046768, dated Mar. 15, 2021.
KIPO, Office Action for KR Application No. 10-2019-7036135, Sep. 28, 2021.

\* cited by examiner

400

```
┌─────────────────────────────────────────────────────────┐
│ The network device determines a Resource Block Group (RBG)│
│ size under a transmission bandwidth used for data transmission │ ~ 410
│ with a terminal device according to a specific parameter M and │
│ the transmission bandwidth                              │
└─────────────────────────────────────────────────────────┘
                            │
┌─────────────────────────────────────────────────────────┐
│ The network device determines a target RBG for data     │ ~ 420
│ transmission from N RBGs within the transmission bandwidth │
└─────────────────────────────────────────────────────────┘
                            │
┌─────────────────────────────────────────────────────────┐
│ The network device generates a bitmap according to the target │
│ RBG, where the bitmap includes M bits, and values on N bits │ ~ 430
│ from the M bits are used for indicating the target RBG  │
└─────────────────────────────────────────────────────────┘
                            │
┌─────────────────────────────────────────────────────────┐
│ The network device sends a bitmap borne in downlink     │ ~ 440
│ control information to the terminal device              │
└─────────────────────────────────────────────────────────┘
                            │
┌─────────────────────────────────────────────────────────┐
│ The network device transmits the data with              │ ~ 450
│ the terminal device on the target RBG                   │
└─────────────────────────────────────────────────────────┘
```

FIG. 4

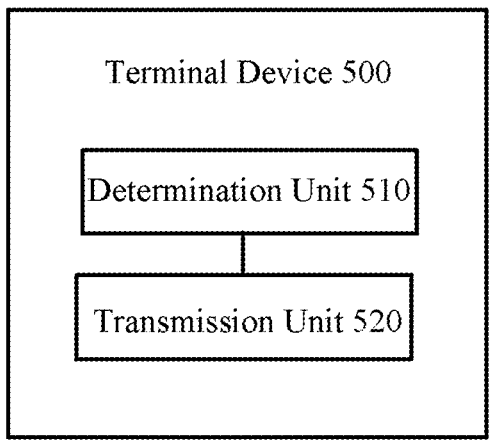

FIG. 5

DATA TRANSMISSION METHOD, TERMINAL DEVICE AND NETWORK DEVICE

CROSS-REFERENCE TO RELATED APPLICATION

This application is a U.S. national phase application of International Application No. PCT/CN2017/087630, filed Jun. 8, 2017, the entire disclosure of which is incorporated herein by reference.

TECHNICAL FIELD

The embodiments of the present disclosure relate to the field of wireless communications, and more particularly, to a data transmission method, a terminal device and a network device.

BACKGROUND

In a Long Term Evolution (LTE) system, frequency domain resources occupied by data transmission are allocated in unit of Resource Block Group (RBG). Each RBG contains a set of consecutive Resource Bocks (RB), a RBG Size is associated with a system bandwidth, and the RBG sizes in different system bandwidths are different, therefore the numbers of the RBGs in different system bandwidths are different. A network device may indicate the RBG used by a terminal device to the terminal device by a bitmap borne in Download Control Information (DCI).

In a 5G system, or known as a New Radio system, a utilized bandwidth, or known as a transmission bandwidth (bandwidth part) of the terminal device may be less than the system bandwidth. The terminal device may use different transmission bandwidths for data transmission in different time periods. With the change of the transmission bandwidth, the network device requires bitmaps of different sizes to indicate the RBGs, thus increasing the number of blind detection of the terminal device, and increasing the blind detection complexity of the terminal device.

SUMMARY

The embodiments of the present application provide a data transmission method, a terminal device and a network device, which can reduce the blind detection complexity of the device.

According to a first aspect, there is provided a data transmission method, including: determining, by a terminal device, a Resource Block Group (RBG) size under a transmission bandwidth used by the terminal device according to a specific parameter M and the transmission bandwidth, wherein M is a positive integer; receiving, by the terminal device, a bitmap borne in downlink control information sent by a network device, wherein the bitmap includes M bits; determining, by the terminal device, a target RBG for data transmission from N RBGs within the transmission bandwidth according to values on N bits from the M bits, wherein N is determined according to the transmission bandwidth and the RBG size, and N is a positive integer less than or equal to M; and transmitting, by the terminal device, the data with the network device on the target RBG.

Therefore, the terminal device determines the RBG size used under the current transmission bandwidth based on the specific parameter, and uses the bitmaps with the same size to indicate the RBG when using different transmission bandwidths, so that the terminal device can flexibly and efficiently determine the RBG size and reduce the blind detection complexity.

In a probable implementation manner, the transmission bandwidth is equal to W, the RBG size is equal to S, and S is a minimum RBG size greater than W/M from a plurality of preset RBG sizes.

In a probable implementation manner, N is equal to $\lceil W/S \rceil$, and $\lceil \ \rceil$ refers to rounding up.

In a probable implementation manner, before the determining, by the terminal device, the RBG size under the transmission bandwidth used by the terminal device according to the specific parameter M and the transmission bandwidth, the method further includes: determining, by the terminal device, an M corresponding to a basic parameter set used according to the basic parameter set, wherein different basic parameter sets are corresponding to different parameters M.

In a probable implementation manner, before the determining, by the terminal device, the RBG size under the transmission bandwidth used by the terminal device according to the specific parameter M and the transmission bandwidth, the method further includes: receiving, by the terminal device, first indication information for indicating M sent by the network device, wherein the first indication information includes Downlink Control Information (DCI), a Radio Resource Control (RRC) Signaling, System Information (SI) or a Media Access Control Element (MAC CE).

In a probable implementation manner, before the determining, by the terminal device, the RBG size under the transmission bandwidth used by the terminal device according to the specific parameter M and the transmission bandwidth, the method further includes: determining, by the terminal device, the transmission bandwidth, wherein the terminal device uses different transmission bandwidths within different transmission time periods.

In a probable implementation manner, the determining, by the terminal device, the transmission bandwidth includes: receiving, by the terminal device, second indication information for indicating the transmission bandwidth sent by the network device, wherein the second indication information includes DCI, a RRC Signaling, System Information (SI) or a MAC CE.

According to a second aspect, there is provided a data transmission method, including: determining, by a network device, a Resource Block Group (RBG) size under a transmission bandwidth used for data transmission with a terminal device according to a specific parameter M and the transmission bandwidth, wherein M is a positive integer; determining, by the network device, a target RBG for data transmission from N RBGs within the transmission bandwidth, wherein N is determined according to the transmission bandwidth and the RBG size, and N is a positive integer less than or equal to M; generating, by the network device, a bitmap according to the target RBG, wherein the bitmap includes M bits, and values on N bits from the M bits are used for indicating the target RBG; sending, by the network device, the bitmap borne in downlink control information to the terminal device; and transmitting, by the network device, the data with the terminal device on the target RBG.

Therefore, the network device determines the RBG size used under the current transmission bandwidth based on the specific parameter, and uses the bitmaps with the same size to indicate the RBG when using different transmission bandwidths, so that the network device can flexibly and efficiently determine the RBG size and reduce the blind detection complexity.

In a probable implementation manner, the transmission bandwidth is equal to W, the RBG size is equal to S, and S is a minimum RBG size greater than W/M from a plurality of preset RBG sizes.

In a probable implementation manner, N is equal to ⌈W/S⌉, and ⌈ ⌉ refers to rounding up.

In a probable implementation manner, before the determining, by the network device, the RBG size under the transmission bandwidth used for data transmission with the terminal device according to the M and the transmission bandwidth, the method further includes: determining, by the network device, an M corresponding to a basic parameter set used according to the basic parameter set, wherein different basic parameter sets are corresponding to different parameters M.

In a probable implementation manner, the method further includes: sending, by the network device, first indication information for indicating M to the terminal device, wherein the first indication information includes Downlink Control Information (DCI), a Radio Resource Control (RRC) Signaling, System Information (SI) or a Media Access Control Element (MAC CE).

In a probable implementation manner, before the determining, by the network device, the RBG size under the transmission bandwidth used for data transmission with the terminal device according to the M and the transmission bandwidth, the method further includes: determining, by the network device, the transmission bandwidth, wherein the network device uses different transmission bandwidths to perform data transmission with the terminal device within different transmission time periods.

In a probable implementation manner, the method further includes: sending, by the network device, second indication information for indicating the transmission bandwidth to the terminal device, wherein the second indication information includes DCI, a RRC Signaling, System Information (SI) or a MAC CE.

According to a third aspect, there is provided a terminal device that can perform the operations of the terminal device in the above-mentioned first aspect or any optional implementation manner of the first aspect. Specifically, the terminal device may include module units configured to perform the operations of the terminal device in the above-mentioned first aspect or any probable implementation manner of the first aspect.

According to a fourth aspect, there is provided a network device that can perform the operations of the network device in the above-mentioned second aspect or any optional implementation manner of the second aspect. Specifically, the network device may include module units configured to perform the operations of the network device in the above-mentioned second aspect or any probable implementation manner of the second aspect.

According to a fifth aspect, there is provided a terminal device, including: a processor, a transceiver and a memory. The processor, the transceiver and the memory communicate with each other through an internal connection path. The memory is configured to store instructions, and the processor is configured to execute the instructions stored in the memory. When the processor executes the instructions stored in the memory, the execution enables the terminal device to execute the method in the first aspect or any probable implementation manner of the first aspect, or the execution enables the terminal device to implement the terminal device provided in the third aspect.

According to a six aspect, there is provided a network device, including: a processor, a transceiver and a memory. The processor, the transceiver and the memory communicate with each other through an internal connection path. The memory is configured to store instructions, and the processor is configured to execute the instructions stored in the memory. When the processor executes the instructions stored in the memory, the execution enables the network device to execute the method in the second aspect or any probable implementation manner of the second aspect, or the execution enables the network device to implement the terminal device provided in the fourth aspect.

According to a seventh aspect, there is provided a computer readable storage medium storing a program that enables the terminal device to execute any one of the data transmission methods described in the above-mentioned first aspect and various implementation manners of the first aspect.

According to an eighth aspect, there is provided a computer readable storage medium storing a program that enables the network device to execute any one of the data transmission methods described in the above-mentioned second aspect and various implementation manners of the second aspect.

According to a ninth aspect, there is provided a system chip including an input interface, an output interface, a processor and a memory, wherein the processor is configured to execute instructions stored in the memory, and when the instructions are executed, the processor can implement any method in the forgoing first aspect and various implementation manners of the first aspect.

According to a tenth aspect, there is provided a system chip including an input interface, an output interface, a processor and a memory, wherein the processor is configured to execute instructions stored in the memory, and when the instructions are executed, the processor can implement any method in the forgoing second aspect and various implementation manners of the second aspect.

According to an eleventh aspect, there is provided a computer program product storing instructions that enable a computer to execute any one of the methods in the above-mentioned first aspect or any optional implementation manner of the first aspect when the computer program product is running on the computer.

According to a twelfth aspect, there is provided a computer program product storing instructions that enable a computer to execute any one of the methods in the above-mentioned second aspect or any optional implementation manner of the second aspect when the computer program product is running on the computer.

BRIEF DESCRIPTION OF THE DRAWINGS

FIG. 4 is a schematic flow chart of a data transmission method according to an embodiment of the present application.

FIG. 5 is a schematic block diagram of a network device according to an embodiment of the present application.

DETAILED DESCRIPTION

The technical solutions of the embodiments of the present application will be described hereinafter in detail with reference to the drawings.

It should be understood that the technical solutions of the embodiments of the present application may be applied to various communication systems, for example: a Global System of Mobile Communication (GSM), a Code Division Multiple Access (CDMA) system, a Wideband Code Division Multiple Access (WCDMA) system, a Long Term Evolution (LTE) system, a LTE Frequency Division Duplex (FDD) system, a LTE Time Division Duplex (TDD) system, a Universal Mobile Telecommunication System (UMTS), a 5G communication system in the future, or the like.

The present application describes various embodiments in connection with a terminal device. The terminal device may also be referred to as a User Equipment (UE), an access terminal, a subscriber unit, a subscriber station, a mobile station, a mobile stage, a remote station, a remote terminal, a mobile device, a subscriber terminal, a terminal, a wireless communication device, a subscriber agent or a subscriber apparatus. The access terminal may be a cellular phone, a cordless phone, a Session Initiation Protocol (SIP) phone, a Wireless Local Loop (WLL) station, a Personal Digital Assistant (PDA), a handheld device with wireless communication capabilities, a computing device or other processing device connected to wireless modems, an on-vehicle device, a wearable device, a terminal device in future 5G networks, or a terminal device in future evolved Public Land Mobile Network (PLMN) networks.

The present application describes various embodiments in connection with a network device. The network device may be a device which is configured to communicate with the terminal device, for example, the network device may be a base station (Base Transceiver Station, BTS) in a GSM or CDMA, or a base station (NodeB, NB) in a WCDMA system, or an evolutional base station (Evolutional NodeB, eNB or eNodeB) in a LTE system; or, the network device may be a relay station, an access point, an on-vehicle device, a wearable device and a network-side device in future 5G networks or a network-side device in future evolved PLMN networks, etc.

Figure 1:
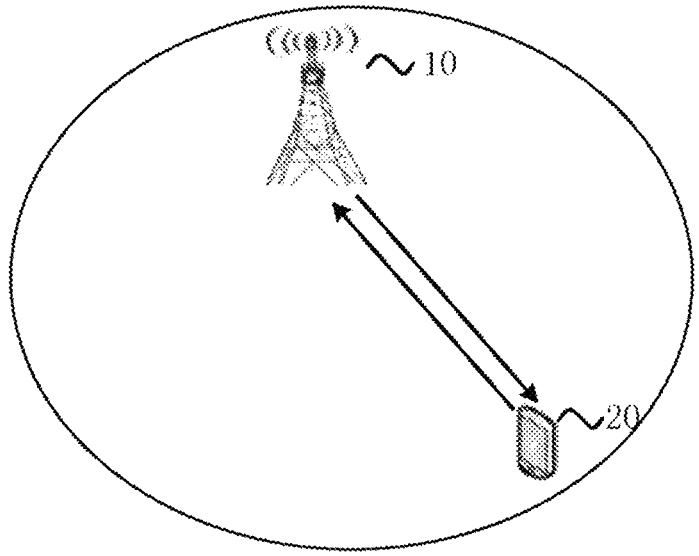
FIG. 1 is a schematic architecture diagram of an application scenario according to an embodiment of the present application.

FIG. 1 is a schematic diagram of an application scenario according to an embodiment of the present application. As shown in FIG. 1, a communication system may include a network device 10 and a terminal device 20. The network device 10 is configured to provide communication services for the terminal device 20 and access a core network. The terminal device 20 may access the network by searching for synchronization signals, broadcast signals, and the like sent by the network device 10, thereby performing communications with the network. Arrows shown in FIG. 1 may represent uplink/downlink transmissions through a cellular link between the terminal device 20 and the network device 10.

The network in the embodiments of the present application may refer to a Public Land Mobile Network (PLMN) or a Device to Device (D2D) network or a Machine to Machine/Man (M2M) network or other networks. FIG. 1 is only a simplified schematic diagram illustrated, and other terminal device may further be included in the network, which is not shown in FIG. 1.

The frequency domain resource occupied by data transmission between the terminal device and the network device is allocated in a unit of Resource Block Group (RBG). Each RBG contains a set of consecutive Resource Bocks (RBs). The RBG size is associated with a system bandwidth, for example, a relation between the system bandwidth and the RBG size shown in Table 1. The RBG sizes in different system bandwidths are different. The system bandwidth in Table 1 is expressed by the number of RBs included in the system bandwidth, and the RBG size is expressed by the number of RBs included in each RBG.

TABLE 1

| System Bandwidth | RBG size |
| --- | --- |
| ≤10 | 1 |
| 11 to 26 | 2 |
| 27 to 63 | 3 |
| 64 to 110 | 4 |

It can be seen that with the change of the system bandwidth, the RBG size is also changed, and the numbers of RBGs under different system bandwidths are different, so the network device needs bitmaps ranging from 1 bit to 28 bits to indicate to the terminal device those RBGs used for data transmission from a plurality of RBGs within the transmission bandwidth, thus a size of the downlink control information is changed at any time, and the number of possible payloads used by the terminal device for blind detection of the DCI is also varied, resulting in high blind detection complexity of the terminal device, as well as increased time delay and power consumption.

The embodiments of the present application determine the RBG size used under the current transmission bandwidth based on a specific parameter, and use the bitmaps with the same size to indicate the RBG when using different transmission bandwidths, so that the terminal device and the network device can flexibly and efficiently determine the RBG size and the blind detection complexity is reduced.

Figure 2:
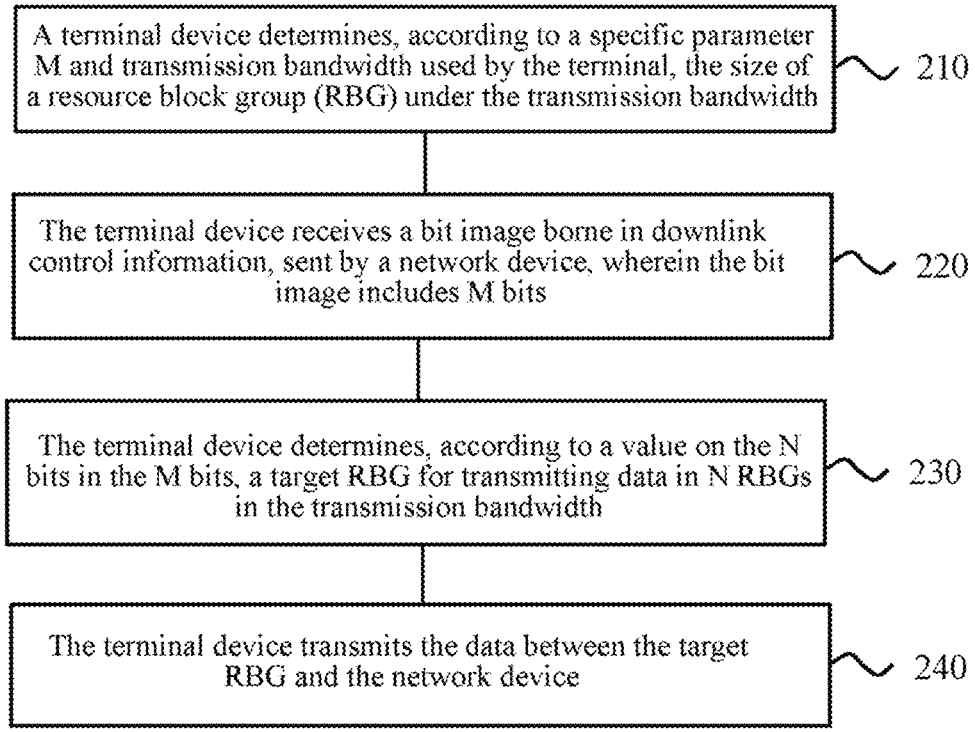
FIG. 2 is a schematic flow chart of a data transmission method according to an embodiment of the present application.

FIG. 2 is a schematic flow chart of a data transmission method according to an embodiment of the present application. The method shown in FIG. 2 may be executed by a terminal device, which may be, for example, the terminal device 20 shown in FIG. 1. As shown in FIG. 2, the data transmission method includes the following steps.

In 210, the terminal device determines a Resource Block Group (RBG) size under a transmission bandwidth used by the terminal device according to a specific parameter M and the transmission bandwidth.

M is a positive integer, M may be a fixed value, i.e., M is the same under any transmission condition. M may also vary with transmission conditions, and different values of M are used for different transmission conditions, for example, when transmitting by using a different basic parameter set. The specific parameter M in the embodiments of the present application may be obtained through the following two methods.

First Method

Optionally, before the terminal device determines the Resource Block Group (RBG) size under the transmission bandwidth used by the terminal device according to the specific parameter M and the transmission bandwidth, the method further includes: determining, by the terminal device, an M corresponding to a basic parameter set used according to the basic parameter set, wherein different basic parameter sets are corresponding to different parameters M.

In this embodiment, the terminal device may determine the value of M corresponding to the basic parameter set used according to the basic parameter set used by itself (for example, a subcarrier interval), and a corresponding relationship between a plurality of basic parameter sets and a plurality of values of M. The same value of M is used for one type of basic parameter set, as shown in Table 2 for example, when the subcarrier interval is 15 kHz, M=35, when the subcarrier interval is 30 kHz, M=18; when the subcarrier interval is 60 kHz, M=9; when the subcarrier interval is 120 kHz, M=5; and when the subcarrier interval is 240 kHz, M=3.

TABLE 2

| Subcarrier Interval | Value of M |
|---|---|
| 15 kHz | 35 |
| 30 kHz | 18 |
| 60 kHz | 9 |
| 120 kHz | 5 |
| 240 kHz | 3 |

Second Method

Optionally, before the terminal device determines the Resource Block Group (RBG) size under the transmission bandwidth used by the terminal device according to the specific parameter M and the transmission bandwidth, the method further includes: receiving, by the terminal device, first indication information for indicating M sent by the network device.

Optionally, the first indication information includes Downlink Control Information (DCI), a Radio Resource Control (RRC) Signaling, System Information (SI) or a Media Access Control (MAC) Control Element (CE).

After M is determined, the terminal device also needs to know a transmission bandwidth that is available within the current transmission time period. Optionally, before 210, the method further includes: determining, by terminal device, the transmission bandwidth.

The transmission bandwidth may be less than or equal to the system bandwidth, and the terminal device may use different transmission bandwidths within different transmission time periods. For example, the transmission bandwidth used by the terminal device for data transmission in a first time period $T_1$ is 40 kHz, while the transmission bandwidth used for data transmission in a next time period $T_2$ may be 80 kHz. Therefore, the terminal device can dynamically adjust the RBG size according to different transmission bandwidths within different transmission time periods, thereby implementing flexible and efficient resource allocation.

Optionally, the determining, by the terminal device, the transmission bandwidth includes: receiving, by the terminal device, second indication information for indicating the transmission bandwidth sent by the network device.

Optionally, the second indication information includes DCI, a RRC Signaling, System Information (SI) or a MAC CE.

In 210, after acquiring the value of M and the transmission bandwidth used, the terminal device may determine the RBG size under the transmission bandwidth according to M and the transmission bandwidth.

Optionally, the transmission bandwidth is equal to W, the RBG size is equal to S, and S is a minimum RBG size greater than W/M from a plurality of preset RBG sizes.

Specifically, the terminal device calculates a ratio W/M of the specific parameter M and the used transmission bandwidth W according to the specific parameter M and the used transmission bandwidth W, and selects the minimum RBG size greater than W/M from the plurality of candidate RBG sizes as the RBG size used under the transmission bandwidth W. If the minimum RBG size greater than RBG from the plurality of RBG sizes is equal to S, then the RBG size used under the transmission bandwidth W is equal to S.

For example, assuming M=35, W=220, and the candidate RBG sizes include {1, 2, 4, 8, 16}, then S is the minimum value greater than 220/35 from the {1, 2, 4, 8, 16}, i.e., S=8. Assuming M=35, W=55, and the candidate RBG sizes include {1, 2, 4, 8, 16}, then S is the minimum value greater than 55/35 from the {1, 2, 4, 8, 16}, i.e., S=2.

It should be understood that the transmission bandwidth here is expressed by the number of RBs included in the transmission bandwidth, W=220 means that the transmission bandwidth includes 220 RBs, and W=55 means that the transmission bandwidth includes 55 RBs. Similarly, the RBG size may also be expressed by the number of RBs contained in one RBG, S=8 means that one RBG includes 8 RBs, and S=2 means that one RBG includes 2 RBs. The transmission bandwidth and the RBG size may also be expressed in other ways, such as Hertz (Hz) or Megahertz (MHz), etc.

It should also be understood that the terminal device may calculate W/M by itself according to the transmission bandwidths W and M, and select the minimum RBG size greater than W/M from the plurality of RBG sizes as the RBG size used under the transmission bandwidth, and may also determine the RBG size corresponding to the transmission bandwidth W according to the transmission bandwidth W and the corresponding relationship between the plurality of transmission bandwidths and the plurality of RBG sizes. The corresponding relationship between the plurality of transmission bandwidths and the plurality of RBG sizes may be presented, for example, through a table, a formula, an image and the like, and in the corresponding relationship, different transmission bandwidths may correspond to the same or different RBG sizes. For example, the terminal device may determine the RBG size S corresponding to the transmission bandwidth W by looking up a table including the corresponding relationship between the plurality of transmission bandwidths and the plurality of RBG sizes. This will not be limited in the embodiments of the present application.

In 220, the terminal device receives a bitmap borne in downlink control information sent by the network device.

The bitmap includes M bits.

At least N bits in the M bits may be used to indicate a target RBG for data transmission from N RBGs within the transmission bandwidth. Through values on the N bits, the terminal device may select those RBGs for transmitting the data with the network device from the N RBGs.

It should be noted that the number N of the RBGs included in the transmission bandwidth may be obtained by determining the RBG size according to the specific parameter M and the transmission bandwidth. The network device uses the N bits from the M bits of the bitmap to indicate to the terminal device which RBGs in the N RBGs in the transmission bandwidth are RBGs for receiving or sending the data.

The reason why the number of bits in the bitmap can be fixed so that the bitmap containing M bits is used for RBG allocation under any transmission bandwidth is that when the plurality of candidate RBG sizes cover a large range, the numbers of RBGs under different transmission bandwidths will not differ too much, and are all close to M. In this way, the utilization ratio N/M of the M bits in the bitmap is relatively high. However, there are only a few preset RBG sizes at current. When the transmission bandwidths differ greatly but the same RBG size is used, the number of RBGs in different transmission bandwidths varies greatly. If the maximum number of RBGs is always used as the number of bits included in the bitmap, a large part of the bits in the bitmap will be wasted.

In 230, the terminal device determines the target RBG for data transmission from the N RBGs within the transmission bandwidth according to the values of N bits from the M bits.

The N bits from the M bits are used to indicate the target RBG for data transmission from the N RBGs included m the transmission bandwidth, wherein N is determined according to the transmission bandwidth and the RBG size, and N is a positive integer less than or equal to M.

Specifically, the terminal device determines which RBGs in the plurality of RBGs within the transmission bandwidth are RBGs used for data transmission according to the bitmap sent by the network device. The number of bits included in the bitmap is equal to M and N bits in the M bits are used to indicate the target RBG for data transmission from the N RBGs. The remaining M−N bits may be left blank or used for other signal transmission.

N here is related to the transmission bandwidth and the RBG size under the transmission bandwidth Optionally, N is equal to $\lceil W/S \rceil$, and $\lceil \ \rceil$ refers to rounding up (cell). N may be understood as the number of RBGs included in the transmission bandwidth W when the RBG size is S, so that the N bits from the M bits in the bitmap are used to indicate the target RBG for data transmission by the terminal device from the N RBGs.

In 240, the terminal device transmits the data with the network device on the target RBG.

For example, assuming that the specific parameter M=9, the transmission bandwidth W=42, the RBG size S=8, and N=$\lceil W/S \rceil$=6, then the bitmap includes 9 bits, of which 6 bits are used for RBG allocation. Assuming that the values on individual bits in the bitmap are shown in Table 3, it may be indicated that the first four RBGs (RBG identifiers are RBG #0, RBG #1, RBG #2 and RBG #3 respectively) in the transmission bandwidth are used for transmitting the data with the network device, where each RBG includes 8 RBs, so the terminal device may then send data to the network device or receive data sent by the network device on RBG #0 to RBG #3.

TABLE 3

| Bitmap (M = 9) | | | | | |
|---|---|---|---|---|---|
| N = 6 | | | | Leave blank or for other purposes | |
| 1 1 | 1 | 1 | 0 | 0 | |

Therefore, the terminal device determines the RBG size used under the current transmission bandwidth based on the specific parameter, and uses the bitmap with the same size to indicate the RBG when using different transmission bandwidths, so that the terminal device can flexibly and efficiently determine the RBG size and the blind detection complexity is reduced.

The terminal device flexibly determines the RBG size used under the transmission bandwidth according to the specific parameter and the transmission bandwidth. The terminal device uses different RBG sizes in different transmission bandwidths, i.e., the RBG size varies with the change of the transmission bandwidth. Therefore, even the bitmap is fixed with M bits and N bits from the M bits are used to indicate the target RBG, the utilization rate (N/M) of the M bits is also high.

The data transmission method according to the embodiment of the present application will be illustrated hereinafter with reference to Tables 4 to 12. The transmission bandwidth W indicates that the transmission bandwidth includes W RBs, and the RBG size S indicates that the RBG includes S RBs.

Table 4 shows a relationship among the transmission bandwidth, the RBG size and the number of bits N for indicating the target RBG when the subcarrier interval is 15 kHz, and M=35. As shown in Table 4, the candidate RBG size $S_i$={1, 2, 4, 8, 16}, for a certain transmission bandwidth $W_i$, the minimum RBG size greater than $W_i/35$ is used as the RBG size $S_i$ under the transmission bandwidth $W_i$. The bitmap used for RBG allocation includes 35 bits, $\lceil W_i/S_i \rceil$ bits may be used for RBG allocation, $\lceil W_i/S_i \rceil \le 35$, and the remaining bits may be left blank or used for other purposes. For example, in the row corresponding to No. 1, when the transmission bandwidth is 5 MHz, i.e., $W_1$=28, the minimum RBG size $S_1$ greater than 28/35 from {1, 2, 4, 8, 16} is 1, and $N_1=\lceil W_1/S_1 \rceil=\lceil 28/1 \rceil=28$; in the row corresponding to No. 2, when the transmission bandwidth is 10 MHz, i.e., $W_2$=55, the minimum RBG size $S_2$ greater than 55/35 from {1, 2, 4, 8, 16} is 2, and $N_2=\lceil W_2/S_2 \rceil=\lceil 55/21 \rceil=28$; and in the row corresponding to No. 8, when the transmission bandwidth is 70 MHz, i.e., $W_8$=385, the minimum RBG size $S_8$ greater than 385/35 from {1, 2, 4, 8, 16} is 16, and $N_8=\lceil W_8/S_8 \rceil=\lceil 385/16 \rceil=25$.

TABLE 4

| (Subcarrier interval is 15 kHz, and M = 35) | | | | |
|---|---|---|---|---|
| No. | Transmission Bandwidth (MHz) | Transmission Bandwidth ($W_i$) | RBG size ($S_i$) | $N_i$ |
| 1 | 5 | $W_1$ = 28 | $S_1$ = 1 | $N_1$ = 28 |
| 2 | 10 | $W_2$ = 55 | $S_2$ = 2 | $N_2$ = 28 |
| 3 | 20 | $W_3$ = 110 | $S_3$ = 4 | $N_3$ = 28 |
| 4 | 30 | $W_4$ = 165 | $S_4$ = 8 | $N_4$ = 21 |
| 5 | 40 | $W_5$ = 220 | $S_5$ = 8 | $N_5$ = 28 |
| 6 | 50 | $W_6$ = 275 | $S_6$ = 8 | $N_6$ = 35 |
| 7 | 60 | $W_7$ = 330 | $S_7$ = 16 | $N_7$ = 21 |
| 8 | 70 | $W_8$ = 385 | $S_8$ = 16 | $N_8$ = 25 |
| 9 | 80 | $W_9$ = 440 | $S_9$ = 16 | $N_9$ = 28 |
| 10 | 90 | $W_{10}$ = 495 | $S_{10}$ = 16 | $N_{10}$ = 31 |
| 11 | 100 | $W_{11}$ = 550 | $S_{11}$ = 16 | $N_{11}$ = 35 |

Figure 3:
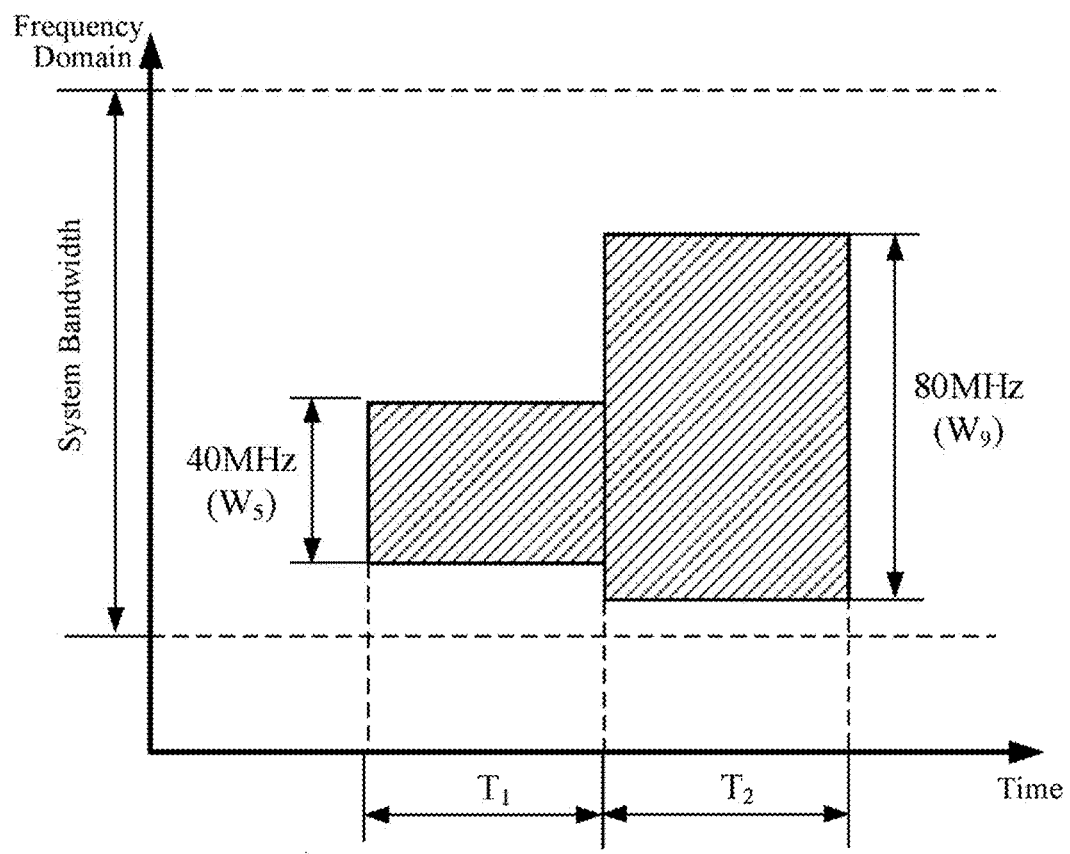
FIG. 3 is a schematic diagram of data transmission in different transmission time periods according to an embodiment of the present application.

The terminal device may use different transmission bandwidths within different transmission time periods, such as the schematic diagram of data transmission in different transmission time periods shown in FIG. 3. If the transmission bandwidth of the terminal device in the transmission time period $T_1$ is 40 MHz, i.e., $W_5$=220, then according to Table 4, the RBG size $S_5$ in T1 is 8, i.e., one RBG includes 8 RBGs. If the transmission bandwidth of the terminal device in the transmission time period $T_2$ is 80 MHz, i.e., $W_9$=440, then according to Table 4, the RBG size $S_9$ in $T_2$ is 16, i.e., one RBG includes 16 RBGs. The terminal device dynamically adjusts the RBG size according to different transmission bandwidths within different transmission time periods, thereby implementing flexible and efficient resource allocation.

It can be seen that the terminal device here determines the RBG size according to the specific parameter M and the transmission bandwidth, thus obtaining the number N of RBGs included in the transmission bandwidth. N bits from the M bits of the bitmap are used to indicate which RBGs from the N RBGs in the transmission bandwidth are RBGs for receiving or sending the data. Under any transmission bandwidth, the bitmap including M bits is used for RBG allocation. When the plurality of candidate RBG sizes cover a large range, the numbers of RBGs under different transmission bandwidths will not differ too much and are all close to M. For example, the minimum value of N in the last column of Table 4 is 21 and the maximum value is 35. In this way, the utilization ratio N/M of the M bits m the bitmap is relatively high. However, there are only a few preset RBG sizes at current. For example, as shown in Table 1, when the transmission bandwidth is 10, the RBG size is 1, which requires 10 bits for indication. When the transmission bandwidth is 110, the RBG size is 4, which requires 28 bits for indication. If the size of the bitmap is fixed as 28 bits, when the transmission bandwidth is 10, only 10 bits from the 28 bits of the bitmap are used to indicate the RBG, the remaining bits are wasted, the utilization rate of the bits is very low, and therefore, the bits of the bitmap cannot be fixed. Since the number of bits of the bitmap sent for different transmission bandwidths changes constantly, the blind detection complexity of the terminal device is increased.

Table 5 shows a relationship among the transmission bandwidth, the RBG size and the number of bits N for indicating the target RBG when the subcarrier interval is 30 kHz, and M=35. As shown in Table 5, a candidate RBG size $S_i=\{1, 2, 4, 8\}$, for a certain transmission bandwidth $W_i$, the minimum RBG size greater than $W_i/35$ is used as the RBG size $S_i$ under the transmission bandwidth $W_i$. The bitmap used for RBG allocation includes 35 bits, $\lceil W_i/S_i \rceil$ bits may be used for RBG allocation, $\lceil W_i/S_i \rceil \leq 35$, and the remaining bits may be left blank or used for other purposes. For example, in the row corresponding to No. 1, when the transmission bandwidth is 5 MHz, i.e., $W_1=14$, the minimum RBG size $S_1$ greater than 14/35 from $\{1, 2, 4, 8\}$ is 1, and $N_1=\lceil W_1/S_1 \rceil=\lceil 14/1 \rceil=14$; in the row corresponding to No. 2, when the transmission bandwidth is 10 MHz, i.e., $W_2=28$, the minimum RBG size $S_2$ greater than 28/35 from $\{1, 2, 4, 8\}$ is 2, and $N_2=\lceil W_2/S_2 \rceil=\lceil 28/1 \rceil=28$; and in the row corresponding to No. 7, when the transmission bandwidth is 60 MHz, i.e., $W_7=165$, the minimum RBG size $S_7$ greater than 165/35 from $\{1, 2, 4, 8\}$ is 8, and $N_7=\lceil W_7/S_7 \rceil=\lceil 165/8 \rceil=21$.

TABLE 5

(Subcarrier interval is 30 kHz, and M = 35)

| No. | Transmission Bandwidth (MHz) | Transmission Bandwidth (W) | RBG size (S) | N |
|---|---|---|---|---|
| 1 | 5 | $W_1 = 14$ | $S_1 = 1$ | $N_1 = 14$ |
| 2 | 10 | $W_2 = 28$ | $S_2 = 1$ | $N_2 = 28$ |
| 3 | 20 | $W_3 = 55$ | $S_3 = 2$ | $N_3 = 28$ |
| 4 | 30 | $W_4 = 83$ | $S_4 = 4$ | $N_4 = 21$ |
| 5 | 40 | $W_5 = 110$ | $S_5 = 4$ | $N_5 = 28$ |
| 6 | 50 | $W_6 = 138$ | $S_6 = 4$ | $N_6 = 35$ |
| 7 | 60 | $W_7 = 165$ | $S_7 = 8$ | $N_7 = 21$ |
| 8 | 70 | $W_8 = 193$ | $S_8 = 8$ | $N_8 = 25$ |
| 9 | 80 | $W_9 = 220$ | $S_9 = 8$ | $N_9 = 28$ |
| 10 | 90 | $W_{10} = 248$ | $S_{10} = 8$ | $N_{10} = 31$ |
| 11 | 100 | $W_{11} = 275$ | $S_{11} = 8$ | $N_{11} = 35$ |

According to Table 4 and Table 5, it can be seen that when the subcarrier intervals are different, it may be stipulated to use the same value of M (35). Alternatively, as shown in Table 6, different values of M may be used for different subcarrier intervals.

Table 6 shows a relationship among the transmission bandwidth, the RBG size and the number of bits N for indicating the target RBG when the subcarrier interval is 30 kHz, and M=18. As shown in Table 6, a candidate RBG size $S_i=\{1, 2, 4, 8, 16\}$, for a certain transmission bandwidth $W_i$, the minimum RBG size greater than $W_i/18$ is used as the RBG size $S_i$ under the transmission bandwidth $W_i$. The bitmap used for RBG allocation includes 18 bits, $\lceil W_i/S_i \rceil$ bits may be used for RBG allocation, $\lceil W_i/S_i \rceil \leq 18$, and the remaining bits may be left blank or used for other purposes. For example, in the row corresponding to No. 1, when the transmission bandwidth is 5 MHz, i.e., $W_i=14$, the minimum RBG size $S_1$ greater than 14/18 from $\{1, 2, 4, 8, 16\}$ is 1, and $N_i\lceil W_i/S_i \rceil=\lceil 14/1 \rceil=14$; in the row corresponding to No. 2, when the transmission bandwidth is 10 MHz, i.e., $W_2=28$, the minimum RBG size $S_2$ greater than 28/18 from $\{1, 2, 4, 8, 16\}$ is 2, and $N_2=\lceil W_2/S_2 \rceil=\lceil 18/2 \rceil=14$; and in the row corresponding to 8, when the transmission bandwidth is 70 MHz, i.e., $W_8=193$, the minimum RBG size $S_8$ greater than 193/18 from $\{1, 2, 4, 8, 16\}$ is 16, and $N_8=\lceil W_8/S_8 \rceil=\lceil 193/16 \rceil=13$.

TABLE 6

(Subcarrier interval is 30 kHz, and M = 18)

| No. | Transmission Bandwidth (MHz) | Transmission Bandwidth (W) | RBG size (S) | N |
|---|---|---|---|---|
| 1 | 5 | $W_1 = 14$ | $S_1 = 1$ | $N_1 = 14$ |
| 2 | 10 | $W_2 = 28$ | $S_2 = 2$ | $N_2 = 14$ |
| 3 | 20 | $W_3 = 55$ | $S_3 = 4$ | $N_3 = 14$ |
| 4 | 30 | $W_4 = 83$ | $S_4 = 8$ | $N_4 = 11$ |
| 5 | 40 | $W_5 = 110$ | $S_5 = 8$ | $N_5 = 14$ |
| 6 | 50 | $W_6 = 138$ | $S_6 = 8$ | $N_6 = 318$ |
| 7 | 60 | $W_7 = 165$ | $S_7 = 16$ | $N_7 = 11$ |
| 8 | 70 | $W_8 = 193$ | $S_8 = 16$ | $N_8 = 13$ |
| 9 | 80 | $W_9 = 220$ | $S_9 = 16$ | $N_9 = 14$ |
| 10 | 90 | $W_{10} = 248$ | $S_{10} = 16$ | $N_{10} = 16$ |
| 11 | 100 | $W_{11} = 275$ | $S_{11} = 16$ | $N_{11} = 18$ |

According to Table 4 and Table 6, it can be seen that when the subcarrier interval is 15 kHz, M=35, and when the subcarrier interval is 30 kHz, M=18. Different subcarrier intervals correspond to different values of M. When the subcarrier interval changes from 15 kHz to 30 kHz, the value of M may be appropriately reduced, and the overhead of the downlink control signaling can be further reduced by reducing the number of bits in the bitmap. After the terminal device determines that the size of the bitmap becomes 18 bits, blind detection may be performed on the downlink control signaling according to the bitmap of 18 bit, rather than according to the bitmap of 35 bits, and meanwhile, the blind detection complexity of the terminal device will not be increased.

Table 7 shows a relationship among the transmission bandwidth, the RBG size and the number of bits N for indicating the target RBG when the subcarrier interval is 60 kHz, and M=35. As shown in Table 7, a candidate RBG size $S_i=\{1, 2, 4\}$, for a certain transmission bandwidth $W_i$, the minimum RBG size greater than $W_i/35$ is used as the RBG size $S_i$ under the transmission bandwidth $W_i$. The bitmap used for RBG allocation includes 35 bits, $\lceil W_i/S_i \rceil$ bits may be used for RBG allocation, $\lceil W_i/S_i \rceil \leq 35$, and the remaining bits may be left blank or used for other purposes. For example, in the row corresponding to No. 1, when the transmission bandwidth is 5 MHz, i.e., $W_1=7$, the minimum RBG size $S_1$ greater than 7/35 from $\{1, 2, 4\}$ is 1, and $N_1=\lceil W_1/S_1 \rceil=\lceil 7/1 \rceil=7$; In the row corresponding to No. 4, when the transmission bandwidth is 30 MHz, i.e., $W_4=42$, the minimum RBG size $S_4$ greater than 42/35 from $\{1, 2, 4\}$ is 2, and $N_4=\lceil W_4/S_4 \rceil=\lceil 42/2 \rceil=21$; and in the row corresponding to 7, when the transmission bandwidth is 60 MHz, i.e., $W_7=83$, the minimum RBG size $S_7$ greater than 83/35 from $\{1, 2, 4\}$ is 4, and $N_4=\lceil W_4/S_4 \rceil=\lceil 42/2 \rceil=21$.

TABLE 7

(Subcarrier interval is 60 kHz, and M = 35)

| No. | Transmission Bandwidth (MHz) | Transmission Bandwidth (W) | RBG size (S) | N |
|---|---|---|---|---|
| 1 | 5 | $W_1 = 7$ | $S_1 = 1$ | $N_1 = 7$ |
| 2 | 10 | $W_2 = 14$ | $S_2 = 1$ | $N_2 = 14$ |
| 3 | 20 | $W_3 = 28$ | $S_3 = 1$ | $N_3 = 28$ |
| 4 | 30 | $W_4 = 42$ | $S_4 = 2$ | $N_4 = 21$ |
| 5 | 40 | $W_5 = 55$ | $S_5 = 2$ | $N_5 = 28$ |
| 6 | 50 | $W_6 = 69$ | $S_6 = 2$ | $N_6 = 35$ |
| 7 | 60 | $W_7 = 83$ | $S_7 = 4$ | $N_7 = 21$ |
| 8 | 70 | $W_8 = 97$ | $S_8 = 4$ | $N_8 = 25$ |
| 9 | 80 | $W_9 = 110$ | $S_9 = 4$ | $N_9 = 28$ |
| 10 | 90 | $W_{10} = 124$ | $S_{10} = 4$ | $N_{10} = 31$ |
| 11 | 100 | $W_{11} = 138$ | $S_{11} = 4$ | $N_{11} = 35$ |

According to Table 4, Table 5 and Table 7, it can be seen that when the subcarrier intervals are different, it may be stipulated to use the same value of M (35). Alternatively, as shown in Table 8, different values of M may be used for different subcarrier intervals.

Table 8 shows a relationship among the transmission bandwidth, the RBG size and the number of bits N for indicating the target RBG when the subcarrier interval is 60 kHz, and M=9. As shown in Table 8, a candidate RBG size $S_i=\{1, 2, 4, 8, 16\}$, for a certain transmission bandwidth $W_i$, the minimum RBG size greater than $W_i/9$ is used as the RBG size $S_i$ under the transmission bandwidth $W_i$. The bitmap used for RBG allocation includes 9 bits, $\lceil W_i/S_i \rceil$ bits may be used for RBG allocation, $\lceil W_i/S_i \rceil \leq 9$, and the remaining bits may be left blank or used for other purposes. For example, in the row corresponding to No 1, when the transmission bandwidth is 5 MHz, i.e., $W_1=7$, the minimum RBG size $S_1$ greater than 7/9 from $\{1, 2, 4, 8, 16\}$ is 1, and $N_1=\lceil W_1/S_1 \rceil=\lceil 7/1 \rceil=7$; in the row corresponding to No 2, when the transmission bandwidth is 10 MHz, i.e., $W_2=14$, the minimum RBG size $S_2$ greater than 14/9 from $\{1, 2, 4, 8, 16\}$ is 2, and $N_2=\lceil W_2/S_2 \rceil=\lceil 14/2 \rceil=7$; and in the row corresponding to 7, when the transmission bandwidth is 60 MHz, i.e., $W_7=83$, the minimum RBG size $S_7$ greater than 83/9 from $\{1, 2, 4, 8, 16\}$ is 16, and $N_2=\lceil W_7/S_7 \rceil=\lceil 83/16 \rceil=6$.

TABLE 8

(Subcarrier interval is 60 kHz, and M = 9)

| No. | Transmission Bandwidth (MHz) | Transmission Bandwidth (W) | RBG size (S) | N |
|---|---|---|---|---|
| 1 | 5 | $W_1 = 7$ | $S_1 = 1$ | $N_1 = 7$ |
| 2 | 10 | $W_2 = 14$ | $S_2 = 2$ | $N_2 = 7$ |
| 3 | 20 | $W_3 = 28$ | $S_3 = 4$ | $N_3 = 7$ |
| 4 | 30 | $W_4 = 42$ | $S_4 = 8$ | $N_4 = 6$ |
| 5 | 40 | $W_5 = 55$ | $S_5 = 8$ | $N_5 = 7$ |
| 6 | 50 | $W_6 = 69$ | $S_6 = 8$ | $N_6 = 9$ |
| 7 | 60 | $W_7 = 83$ | $S_7 = 16$ | $N_7 = 6$ |
| 8 | 70 | $W_8 = 97$ | $S_8 = 16$ | $N_8 = 7$ |
| 9 | 80 | $W_9 = 110$ | $S_9 = 16$ | $N_9 = 7$ |
| 10 | 90 | $W_{10} = 124$ | $S_{10} = 16$ | $N_{10} = 8$ |
| 11 | 100 | $W_{11} = 138$ | $S_{11} = 16$ | $N_{11} = 9$ |

According to Table 4, Table 6 and Table 8, it can be seen that when the subcarrier interval is 15 kHz, M=35; and when the subcarrier interval is 30 kHz, M=18. Different subcarrier intervals correspond to different values of M. When the subcarrier interval changes from 15 kHz or 30 kHz to 60 kHz, the value of M may be appropriately reduced, and the overhead of the downlink control signaling can be further reduced by reducing the number of bits in the bitmap. After the terminal device determines that the size of the bitmap becomes 9 bits, blind detection may be performed on the downlink control signaling according to a bitmap including 9 bits rather than according to a bitmap including 35 bits, and meanwhile, the blind detection complexity of the terminal device will not be increased.

Table 9 shows a relationship among the transmission bandwidth, the RBG size and the number of bits N for indicating the target RBG when the subcarrier interval is 120 kHz, and M=35. As shown in Table 9, a candidate RBG size $S_i=\{1, 2\}$, for a certain transmission bandwidth $W_i$, the minimum RBG size greater than $\lceil W_i/S_i \rceil \leq 35$ is used as the RBG size $S_i$ under the transmission bandwidth $W_i$. The bitmap used for RBG allocation includes 35 bits, $\lceil W_i/S_i \rceil$ bits may be used for RBG allocation, $\lceil W_i/S_i \rceil \leq 35$, and the remaining bits may be left blank or used for other purposes. For example, in the row corresponding to No. 1, when the transmission bandwidth is 5 MHz, i.e., $W_1=4$, the minimum RBG size $S_1$ greater than 4/35 from $\{1, 2\}$ is 1, and $N_1=\lceil W_1/S_1 \rceil=\lceil 4/1 \rceil=4$; and in the row corresponding to 7, when the transmission bandwidth is 60 MHz, i.e., $W_7=42$, the minimum RBG size $S_7$ greater than 42/35 from $\{1, 2\}$ is 2, and $N_7=\lceil W_7/S_7 \rceil=\lceil 42/21 \rceil=21$.

TABLE 9

(Subcarrier interval is 120 kHz, and M = 35)

| No. | Transmission Bandwidth (MHz) | Transmission Bandwidth (W) | RBG size (S) | N |
|---|---|---|---|---|
| 1 | 5 | $W_1 = 4$ | $S_1 = 1$ | $N_1 = 4$ |
| 2 | 10 | $W_2 = 7$ | $S_2 = 1$ | $N_2 = 7$ |
| 3 | 20 | $W_3 = 14$ | $S_3 = 1$ | $N_3 = 14$ |
| 4 | 30 | $W_4 = 21$ | $S_4 = 1$ | $N_4 = 21$ |
| 5 | 40 | $W_5 = 28$ | $S_5 = 1$ | $N_5 = 28$ |
| 6 | 50 | $W_6 = 35$ | $S_6 = 1$ | $N_6 = 35$ |
| 7 | 60 | $W_7 = 42$ | $S_7 = 2$ | $N_7 = 21$ |
| 8 | 70 | $W_8 = 49$ | $S_8 = 2$ | $N_8 = 25$ |
| 9 | 80 | $W_9 = 55$ | $S_9 = 2$ | $N_9 = 28$ |
| 10 | 90 | $W_{10} = 62$ | $S_{10} = 2$ | $N_{10} = 31$ |
| 11 | 100 | $W_{11} = 69$ | $S_{11} = 2$ | $N_{11} = 35$ |

According to Table 4, Table 5, Table 7 and Table 9, it can be seen that when the subcarrier intervals are different, it may be stipulated to use the same value of M (35). Alternatively, as shown in Table 10, different values of M may be used for different subcarrier intervals.

Table 10 shows a relationship among the transmission bandwidth, the RBG size and the number of bits N for indicating the target RBG when the subcarrier interval is 120 kHz, and M=5. As shown in Table 10, a candidate RBG size $S_i=\{1, 2, 4, 8, 16\}$, for a certain transmission bandwidth $W_i$, the minimum RBG size greater than $W_i/5$ is used as the RBG size $S_i$ under the transmission bandwidth $W_i$. The bitmap used for RBG allocation includes 5 bits, $\lceil W_i/S_i \rceil$ bits may be used for RBG allocation, $\lceil W_i/S_i \rceil \leq 5$, and the remaining bits may be left blank or used for other purposes. For example, in the row corresponding to No. 1, when the transmission bandwidth is 5 MHz, i.e., $W_1=4$, the minimum RBG size $S_1$ greater than 4/5 from $\{1, 2, 4, 8, 16\}$ is 1, and $N_1=\lceil W_1/S_1 \rceil=\lceil 4/1 \rceil=4$; in the row corresponding to No. 3, when the transmission bandwidth is 20 MHz, i.e., $W_3=14$, the minimum RBG size $S_3$ greater than 14/5 from $\{1, 2, 4, 8, 16\}$ is 4, and $N_3=\lceil W_3/S_3 \rceil=\lceil 14/4 \rceil=4$; and m the row corresponding to 7, when the transmission bandwidth is 60 MHz, i.e., $W_7=42$, the minimum RBG size $S_7$ greater than 42/5 from $\{1, 2, 4, 8, 16\}$ is 16, and $N_7=\lceil W_7/S_7 \rceil=\lceil 42/16 \rceil=3$.

TABLE 10

(Subcarrier interval is 120 kHz, and M = 5)

| No. | Transmission Bandwidth (MHz) | Transmission Bandwidth (W) | RBG size (S) | N |
|---|---|---|---|---|
| 1 | 5 | $W_1 = 4$ | $S_1 = 1$ | $N_1 = 4$ |
| 2 | 10 | $W_2 = 7$ | $S_2 = 2$ | $N_2 = 4$ |
| 3 | 20 | $W_3 = 14$ | $S_3 = 4$ | $N_3 = 4$ |
| 4 | 30 | $W_4 = 21$ | $S_4 = 8$ | $N_4 = 3$ |
| 5 | 40 | $W_5 = 28$ | $S_5 = 8$ | $N_5 = 4$ |
| 6 | 50 | $W_6 = 35$ | $S_6 = 8$ | $N_6 = 5$ |
| 7 | 60 | $W_7 = 42$ | $S_7 = 16$ | $N_7 = 3$ |
| 8 | 70 | $W_8 = 49$ | $S_8 = 16$ | $N_8 = 4$ |
| 9 | 80 | $W_9 = 55$ | $S_9 = 16$ | $N_9 = 4$ |
| 10 | 90 | $W_{10} = 62$ | $S_{10} = 16$ | $N_{10} = 4$ |
| 11 | 100 | $W_{11} = 69$ | $S_{11} = 16$ | $N_{11} = 5$ |

According to Table 4, Table 6, Table 8 and Table 10, it can be seen that when the subcarrier interval is 15 kHz, M=35; when the subcarrier interval is 30 kHz, M=18; when the subcarrier interval is 60 kHz, M=9; and when the subcarrier interval is 120 kHz, M=5; and different subcarrier intervals correspond to different values of M When the subcarrier interval changes from 15 kHz, 30 kHz or 60 kHz to 120 kHz, the value of M may be appropriately reduced, and the overhead of the downlink control signaling can be further reduced by reducing the number of bits in the bitmap. After the terminal device determines that the size of the bitmap becomes 5 bits, blind detection may be performed on the downlink control signaling according to a bitmap of 5 bits rather than according to a bitmap of 35 bits, and meanwhile, the blind detection complexity of the terminal device will not be increased.

Table 11 shows a relationship among the transmission bandwidth, the RBG size and the number of bits N for indicating the target RBG when the subcarrier interval is 240 kHz, and M=35. As shown in Table 11, a candidate RBG size $S_i=\{1\}$, for a certain transmission bandwidth $W_i$, the minimum RBG size greater than $W_i/35$ is used as the RBG size $S_i$ wider the transmission bandwidth $W_i$. The bitmap used for RBG allocation includes 35 bits. $\lceil W_i/S_i \rceil$ bits may be used for RBG allocation, $\lceil W_i/S_i \rceil \leq 35$, and the remaining bits may be left blank or used for other purposes. For example, in the row corresponding to No. 1, when the transmission bandwidth is 5 MHz, i.e., $W_1=2$, $S_1=1$, and $N_1=\lceil W_1/S_1 \rceil=\lceil 2/1 \rceil=2$; and in the row corresponding to No. 7, when the transmission bandwidth is 60 MHz, i.e., $W_7=21$, $S_7=1$, and $N_7=\lceil W_7/S_7 \rceil=\lceil 21/1 \rceil=21$.

TABLE 11

(Subcarrier interval is 240 kHz, and M = 35)

| No. | Transmission Bandwidth (MHz) | Transmission Bandwidth (W) | RBG size (S) | N |
|---|---|---|---|---|
| 1 | 5 | $W_1 = 2$ | $S_1 = 1$ | $N_1 = 2$ |
| 2 | 10 | $W_2 = 4$ | $S_2 = 1$ | $N_2 = 4$ |
| 3 | 20 | $W_3 = 7$ | $S_3 = 1$ | $N_3 = 17$ |
| 4 | 30 | $W_4 = 11$ | $S_4 = 1$ | $N_4 = 11$ |
| 5 | 40 | $W_5 = 14$ | $S_5 = 1$ | $N_5 = 14$ |
| 6 | 50 | $W_6 = 18$ | $S_6 = 1$ | $N_6 = 18$ |
| 7 | 60 | $W_7 = 21$ | $S_7 = 1$ | $N_7 = 21$ |
| 8 | 70 | $W_8 = 25$ | $S_8 = 1$ | $N_8 = 25$ |
| 9 | 80 | $W_9 = 28$ | $S_9 = 1$ | $N_9 = 28$ |
| 10 | 90 | $W_{10} = 31$ | $S_{10} = 1$ | $N_{10} = 31$ |
| 11 | 100 | $W_{11} = 35$ | $S_{11} = 1$ | $N_{11} = 35$ |

According to Table 4, Table 5, Table 7, Table 9 and Table 11, it can be seen that when the subcarrier intervals are different, it may be stipulated to use the same value of M (35). Alternatively, as shown in Table 10, different values of M may be used for different subcarrier intervals.

Table 12 shows a relationship among the transmission bandwidth, the RBG size and the number of bits N for indicating the target RBG when the subcarrier interval is 240 kHz, and M=3. As shown in Table 12, a candidate RBG size $S_i=\{1, 2, 4, 8, 16\}$, for a certain transmission bandwidth $W_i$, the minimum RBG size greater than $W_i/3$ is used as the RBG size $S_i$ under the transmission bandwidth $W_i$. The bitmap used for RBG allocation includes 3 bits, $\lceil W_i/S_i \rceil$ bits may be used for RBG allocation. $\lceil W_i/S_i \rceil \leq 3$, and the remaining bits may be left blank or used for other purposes. For example, in the row corresponding to No. 1, when the transmission bandwidth is 5 MHz, i.e., $W_1=2$, the minimum RBG size $S_1$ greater than 2/3 from $\{1, 2, 4, 8, 16\}$ is 1, and $N_1=\lceil W_1/S_1 \rceil=\lceil 2/1 \rceil=2$; in the row corresponding to No. 4, when the transmission bandwidth is 30 MHz. i.e., $W_4=11$, the minimum RBG size $S_4$ greater than 11/3 from $\{1, 2, 4, 8, 16\}$ is 4, and $N_4=\lceil W_4/S_4 \rceil=\lceil 11/4 \rceil=3$, and in the row corresponding to 7, when the transmission bandwidth is 60 MHz, i.e., $W_7=21$, the minimum RBG size $S_7$ greater than 21/3 from $\{1, 2, 4, 8, 16\}$ is 8, and $N_7=\lceil W_7/S_7 \rceil=\lceil 21/8 \rceil=3$.

TABLE 12

(Subcarrier interval is 240 kHz, and M = 3)

| No. | Transmission Bandwidth (MHz) | Transmission Bandwidth (W) | RBG size (S) | N |
|---|---|---|---|---|
| 1 | 5 | $W_1 = 2$ | $S_1 = 1$ | $N_1 = 2$ |
| 2 | 10 | $W_2 = 3$ | $S_2 = 2$ | $N_2 = 2$ |
| 3 | 20 | $W_3 = 7$ | $S_3 = 4$ | $N_3 = 2$ |
| 4 | 30 | $W_4 = 11$ | $S_4 = 4$ | $N_4 = 3$ |
| 5 | 40 | $W_5 = 14$ | $S_5 = 8$ | $N_5 = 2$ |
| 6 | 50 | $W_6 = 18$ | $S_6 = 8$ | $N_6 = 3$ |
| 7 | 60 | $W_7 = 21$ | $S_7 = 8$ | $N_7 = 3$ |
| 8 | 70 | $W_8 = 25$ | $S_8 = 16$ | $N_8 = 2$ |
| 9 | 80 | $W_9 = 28$ | $S_9 = 16$ | $N_9 = 2$ |

TABLE 12-continued (Subcarrier interval is 240 kHz, and M = 3)

| No. | Transmission Bandwidth (MHz) | Transmission Bandwidth (W) | RBG size (S) | N |
|---|---|---|---|---|
| 10 | 90 | $W_{10} = 31$ | $S_{10} = 16$ | $N_{10} = 2$ |
| 11 | 100 | $W_{11} = 35$ | $S_{11} = 16$ | $N_{11} = 3$ |

According to Table 4, Table 6, Table 8, Table 10 and Table 12, it can be seen that when the subcarrier interval is 15 kHz, M=35; when the subcarrier interval is 30 kHz, M=18; when the subcarrier interval is 60 kHz, M=9, and when the subcarrier interval is 120 kHz, M=5; and when the subcarrier interval is 240 kHz, M=3; and different subcarrier intervals correspond to different values of M. When the subcarrier interval changes from 15 kHz, 30 kHz, 60 kHz or 120 kHz to 240 kHz, the value of M may be appropriately reduced, and the overhead of the downlink control signaling can be further reduced by reducing the number of bits in the bitmap. After the terminal device determines that the size of the bitmap becomes 3 bits, blind detection may be performed on the downlink control signaling according to a bitmap of 3 bits rather than according to a bitmap of 35 bits, and meanwhile, the blind detection complexity of the terminal device will not be increased.

The transmission bandwidth in a 5G NR system will be greatly increased (for example, up to 100 MHz), and the number of RBs may reach 550. Therefore, frequency domain resources need to be allocated more flexibly, and thus more diverse RBG sizes are needed. However, if a LTE design method is followed, the size of the bitmap used for resource allocation will change more frequently, the size of the downlink control information used for carrying resource allocation information will also change frequently, and the number of possible payload when the terminal device or the network device blindly detects the DCI will also have too many possibilities, so that the complexity, delay and power consumption of the blind detection will be greatly increased.

The embodiments of the present application propose to determine the RBG size used under the current transmission bandwidth based on the specific parameter, and uses the bitmaps with the same size to indicate the RBG with respect to different transmission bandwidths, so that the terminal device can flexibly and efficiently determine the RBG size and the blind detection complexity is reduced.

FIG. 4 is a schematic flow chart of a data transmission method according to an embodiment of the present application. The method shown in FIG. 4 may be executed by a network device, and the network device may be, for example, the network device 10 shown in FIG. 1. As shown in FIG. 4, the data transmission method includes the following steps.

In 410, a network drive determines a Resource Block Group (RBG) size under a transmission bandwidth used for data transmission with a terminal device according to a specific parameter M and the transmission bandwidth.

M is a positive integer. M may be a fixed value, i.e., M is the same under any transmission condition. M may also vary with change of the transmission conditions, and different values of M are used for different transmission conditions, for example, when transmitting using different basic parameter sets.

Optionally, before the network device determines the RBG size under the transmission bandwidth for data transmission with the terminal device according to the specific parameter M and the transmission bandwidth, the method further includes: determining, by the network device, an M corresponding to a basic parameter set used according to the basic parameter set, where different basic parameter sets are corresponding to different parameters M.

In the embodiment, the network device may determine the value of M corresponding to the basic parameter set used according to the basic parameter set used by itself, for example, a subcarrier interval, and a corresponding relationship between a plurality of basic parameter sets and a plurality of values of M. The same value of M is used for one basic parameter set, for example, when the subcarrier interval is 15 kHz, M=35; when the subcarrier interval is 30 kHz, M=18; when the subcarrier interval is 60 kHz, M=9; when the subcarrier interval is 120 kHz, M=5; and when the subcarrier interval is 240 kHz, M=3.

Optionally, the method further includes: sending, by the network device, first indication information for indicating M to the terminal device.

Optionally, the first indication information includes Downlink Control Information (DCI), a Radio Resource Control (RRC) Signaling, System Information (SI) or a Media Access Control Element (MAC CE).

After the network device determines M, it is also necessary to know a transmission bandwidth within the current transmission time period for data transmission with the terminal device. Optionally, before the network device determines the RBG size under the transmission bandwidth used by the terminal device according to the specific parameter M and the transmission bandwidth, the method further includes: determining, by the network device, the transmission bandwidth.

The transmission bandwidth may be less than or equal to the system bandwidth, and the network device uses different transmission bandwidths for data transmission with the terminal device within different transmission time periods. For example, the transmission bandwidth used by the terminal device for data transmission in a first time period T1 is 40 kHz, while the transmission bandwidth used for data transmission in a next time period T2 may be 80 kHz. Therefore, the terminal device can dynamically adjust the RBG size according to different transmission bandwidths used within different transmission time periods, thereby implementing flexible and efficient resource allocation.

Optionally, the method further includes: sending, by the network device, second indication information for indicating the transmission bandwidth to the terminal device.

Optionally, the second indication information includes DCI, a RRC Signaling, System Information (SI) or a MAC CE.

In 410, after the network device determines the value of M and the transmission bandwidth used, the RBG size under the transmission bandwidth may be determined according to M and the transmission bandwidth.

Optionally, the transmission bandwidth is equal to W, the RBG size is equal to S, and S is a minimum RBG size greater than W/M from a plurality of preset RBG sizes.

Specifically, the network device may calculate the ratio W/M of the specific parameter M and the used transmission bandwidth W according to the specific parameter M and the used transmission bandwidth W, and select the minimum RBG size greater than W/M from the plurality of candidate RBG sizes as the RBG size used under the transmission bandwidth W. If the minimum RBG size greater than W/M from the plurality of RBG sizes is equal to S, then the RBG size used under the transmission bandwidth W is equal to S.

The network device may calculate W/M by itself according to the transmission bandwidths W and M, and select the minimum RBG size greater than W/M from the plurality of RBG sizes as the RBG size used under the transmission bandwidth; and may also determine the RBG size corresponding to the transmission bandwidth W according to the transmission bandwidth W and the corresponding relationship between the plurality of transmission bandwidths and the plurality of RBG sizes. The corresponding relationship between the plurality of transmission bandwidths and the plurality of RBG sizes may be presented, for example, through tables, formulas, images and the like, and different transmission bandwidths may correspond to same or different RBG sizes in the corresponding relationship. For example, the terminal device may determine the RBG size S corresponding to the transmission bandwidth W by looking up a table including the corresponding relationship between the plurality of transmission bandwidths and the plurality of RBG sizes. This will not be limited in the embodiments of the present application.

In 420, the network device determines a target RBG for data transmission from N RBGs within the transmission bandwidth.

N is determined according to the transmission bandwidth and the RBG size, and N is a positive integer less than or equal to M.

N here is related to the transmission bandwidth and the RBG size under the transmission bandwidth. Optionally, N is equal to $\lceil W/S \rceil$, and $\lceil \ \rceil$ refers to rounding up. N may be understood as the number of RBGs included in the transmission bandwidth W when the RBG size is S.

In 430, the network device generates a bitmap according to the target RBG, where the bitmap includes M bits, and values on N bits from the M bits are used for indicating the target RBG.

Specifically, after the network device determines the target RBG for data transmission from the N RBGs, the target RBG may be indicated to the terminal device by means of the bitmap. The bitmap includes M bits, and the values on the N bits from the M bits may be used to indicate which RBGs from the N RBGs may be used for data transmission with the terminal device.

In 440, the network device sends a bitmap borne in downlink control information to the terminal device.

The N bits from the M bits are used to indicate the target RBG for data transmission from the N RBGs included in the transmission bandwidth, where N is determined according to the transmission bandwidth and the RBG size.

Specifically, the terminal device indicates those RBGs used for data transmission from the plurality of RBGs under the transmission bandwidth to the terminal device by sending the bitmap to the terminal device. The number of bits included in the bitmap is equal to M, and at least N bits from the M bits may be used to indicate those target RBGs from the N RBGs which may be used for data transmission with the terminal device. The remaining M−N bits may be left blank or used for other signal transmission.

N may be understood as the number of RBGs included in the transmission bandwidth W when the RBG size is S. Therefore, the N bits from the M bits of the bitmap are used to indicate the targets RBG from the N RBGs used for data transmission with the terminal device.

In 450, the network device transmits the data with the terminal device on the target RBG.

It should be understood that the specific process for the network device to determine the RBG size and perform data transmission based on the RBG size and the bitmap may refer to the foregoing description of the terminal device in FIG. 2, and will not be elaborated for the sake of brevity.

In the embodiments of the present application, the network device determines the RBG size used under the current transmission bandwidth based on the specific parameter, and uses the bitmaps with the same size to indicate the RBG when using different transmission bandwidths, so that the network device can flexibly and efficiently determine the RBG size and the blind detection complexity is reduced.

The network device flexibly determines the RBG size used under the transmission bandwidth according to the specific parameter and the transmission bandwidth. The network device uses different RBG sizes in different transmission bandwidths, i.e., the RBG size varies with the change of the transmission bandwidth. Therefore, even of the bitmap is fixed with M bits and N bits from the M bits are used to indicate the target RBG, the utilization rate (N/M) of the M bits is also high.

It should be understood that in various embodiments of the present application, the size of the sequence numbers of the above-mentioned processes does not mean the order of execution, and the order of execution of each process should be determined by its function and internal logic, and should not constitute any limitation on the implementation process of the embodiments of the present application.

FIG. 5 is a schematic block diagram of a terminal device 500 according to an embodiment of the present application. As shown in FIG. 5, the terminal device 500 includes a determination unit 510 and a transmission unit 520.

The determination unit 510 is configured to determine a Resource Block Group (RBG) size under a transmission bandwidth used by the terminal device according to a specific parameter M and the transmission bandwidth, wherein M is a positive integer.

The transmission unit 520 is configured to receive a bitmap borne in downlink control information sent by a network device, wherein the bitmap includes M bits.

The determination unit 510 is further configured to determine a target RBG for data transmission from N RBGs within the transmission bandwidth according to values on N bits from the M bits, wherein N is determined according to the transmission bandwidth and the RBG size, and N is a positive integer less than or equal to M.

The transmission unit 520 is further configured to transmit the data with the network device on the target RBG.

Therefore, the terminal device determines the RBG size used under the current transmission bandwidth based on the specific parameter, and uses the bitmaps with the same size to indicate the RBG when using different transmission bandwidths, so that the terminal device can flexibly and efficiently determine the RBG size and the blind detection complexity is reduced.

Optionally, the transmission bandwidth is equal to W, the RBG size is equal to S, and S is a minimum RBG size greater than W/M from a plurality of preset RBG sizes.

Optionally, N is equal to $\lceil W/S \rceil$, and $\lceil \ \rceil$ refers to rounding up.

Optionally, the determination unit 510 is further configured to: determine an M corresponding to a basic parameter set used according to the basic parameter set, wherein different basic parameter sets are corresponding to different parameters M.

Optionally, the transmission unit 520 is further configured to: receive first indication information for indicating M sent by the network device, wherein the first indication information includes Downlink Control Information DCI, a Radio Resource Control (RRC) Signaling, System Information (SI) or a Media Access Control Element (MAC CE).

Optionally, the determination unit 510 is further configured to: determine the transmission bandwidth, wherein the terminal device uses different transmission bandwidths within different transmission time periods.

Optionally, the determination unit 510 is specifically configured to: receive second indication information for indicating the transmission bandwidth sent by the network device via the transmission unit 520, wherein the second indication information includes DCI, a RRC Signaling, System Information (SI) or a MAC CE.

Figure 6:
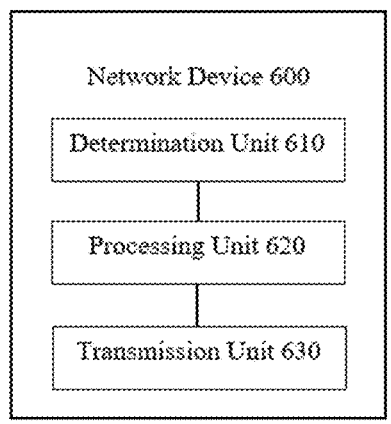
FIG. 6 is a schematic block diagram of a terminal device according to an embodiment of the present application.

FIG. 6 is a schematic block diagram of a network device 600 according to an embodiment of the present application. As shown in FIG. 6, the network device 600 includes a determination unit 610, a processing unit 620 and a transmission unit 630.

The determination unit 610 is configured to determine a Resource Block Group (RBG) size under a transmission bandwidth used for data transmission with a terminal device according to a specific parameter M and the transmission bandwidth, wherein M is a positive integer.

The determination unit 610 is further configured to determine a target RBG for data transmission from N RBGs within the transmission bandwidth, wherein N is determined according to the transmission bandwidth and the RBG size, and N is a positive integer less than or equal to M.

The processing unit 620 is configured to generate a bitmap according to the target RBG, wherein the bitmap includes M bits, and values on N bits from the M bits are used for indicating the target RBG.

The transmission unit 630 is configured to send the bitmap borne in downlink control information to the terminal device.

The transmission unit 630 is further configured to transmit the data with the terminal device on the target RBG.

Therefore, the network device determines the RBG size used under the current transmission bandwidth based on the specific parameter, and uses the bitmaps with the same size to indicate the RBG when using different transmission bandwidths, so that the network device can flexibly and efficiently determine the RBG size and the blind detection complexity is reduced.

Optionally, the transmission bandwidth is equal to W, the RBG size is equal to S, and S is a minimum RBG size greater than W/M from a plurality of preset RBG sizes.

Optionally, N is equal to $\lceil W/S \rceil$, and $\lceil \; \rceil$ refers to rounding up.

Optionally, the determination unit 610 is further configured to: determine an M corresponding to a basic parameter set used according to the basic parameter set, wherein different basic parameter sets are corresponding to different parameters M.

Optionally, the transmission unit 630 is further configured to: send first indication information for indicating M to the terminal device, wherein the first indication information comprises Downlink Control Information (DCI), a Radio Resource Control (RRC) Signaling, System Information (SI) or a Media Access Control Element (MAC CE).

Optionally, the determination unit 610 is further configured to: determine the transmission bandwidth, wherein the network device uses different transmission bandwidths to perform data transmission with the terminal device within different transmission time periods.

Optionally, the transmission unit 630 is further configured to: send second indication information for indicating the transmission bandwidth to the terminal device, wherein the second indication information comprises DCI, a RRC Signaling, System Information (SI) or a MAC CE.

Figure 7:
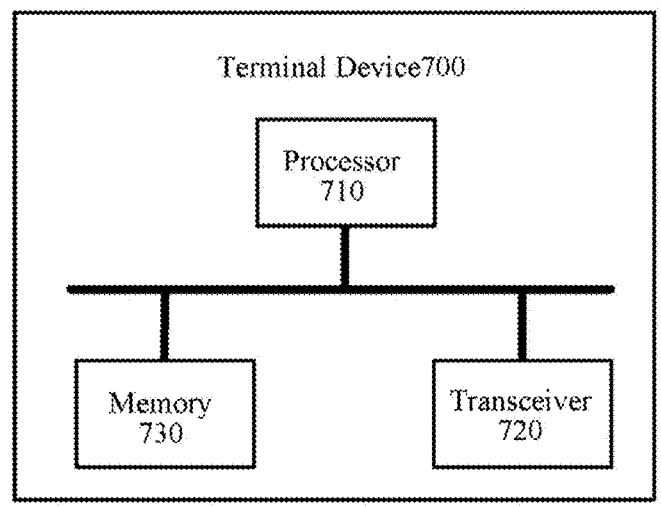
FIG. 7 is a schematic structure diagram of a network device according to an embodiment of the present application.

FIG. 7 is a schematic structure diagram of a terminal device 700 according to an embodiment of the present application. As shown in FIG. 7, the terminal device includes a processor 710, a transceiver 720, and a memory 730, wherein the processor 710, the transceiver 720, and the memory 730 communicate with each other through an internal connection path. The memory 730 is configured to store instructions, and the processor 710 is configured to execute the instructions stored in the memory 730 to control the transceiver 720 to receive signals or send signals.

The processor 710 is configured to determine a Resource Block Group (RBG) size under a transmission bandwidth used for data transmission with a terminal device according to a specific parameter M and the transmission bandwidth, wherein M is a positive integer.

The transceiver 720 is configured to receive a bitmap borne in downlink control information sent by a network device, wherein the bitmap includes M bits.

The processor 710 is further configured to determine a target RBG for data transmission from N RBGs within the transmission bandwidth according to values on N bits from the M bits, wherein N is determined according to the transmission bandwidth and the RBG size, and N is a positive integer less than or equal to M.

The transceiver 720 is further configured to transmit the data with the network device on the target RBG.

Therefore, the terminal device determines the RBG size used under the current transmission bandwidth based on the specific parameter, and uses the bitmaps with the same size to indicate the RBG when using different transmission bandwidths, so that the terminal device can flexibly and efficiently determine the RBG size and the blind detection complexity is reduced.

Optionally, the transmission bandwidth is equal to W, the RBG size is equal to S, and S is a minimum RBG size greater than W/M from a plurality of preset RBG sizes.

Optionally, N is equal to $\lceil W/S \rceil$, and $\lceil \; \rceil$ refers to rounding up.

Optionally, the processor 710 is further configured to determine an M corresponding to a basic parameter set used according to the basic parameter set, wherein different basic parameter sets are corresponding to different parameters M.

Optionally, the transceiver 720 is further configured to: receive first indication information for indicating M sent by the network device, wherein the first indication information includes Downlink Control Information (DCI), a Radio Resource Control (RRC) Signaling, System Information (SI) or a Media Access Control Element (MAC CE).

Optionally, the processor 710 is further configured to: determine the transmission bandwidth, wherein the terminal device uses different transmission bandwidths within different transmission time periods.

Optionally, the processor 710 is specifically configured to: receive second indication information for indicating the transmission bandwidth sent by the network device via the transceiver 720, wherein the second indication information includes DCI, a RRC Signaling, System Information (SI) or a MAC CE.

It should be understood that, in the embodiments of the present application, the processor 710 may be a Central Processing Unit (CPU), and the processor 710 may also be other general purpose processor, a Digital Signal Processors (DSP), an Application Specific Integrated Circuit (ASIC), a Field Programmable Gate Array (FPGA), or other programmable logic device, discrete gate or transistor logic device, discrete hardware assembly, etc. The general purpose processor may be a microprocessor or the processor may be any conventional processor, or the like.

The memory 730 may include a read only memory and a random access memory, and provide instructions and data to the processor 710. A portion of the memory 730 may also include a non-volatile random access memory.

In an implementation process, the steps in the foregoing methods may be completed using an integrated logic circuit of hardware or an instruction in a form of software in the processor 710. The steps of the data transmission methods disclosed with reference to the embodiments of the present application may be directly executed and accomplished by means of a hardware processor or may be executed and accomplished using a combination of hardware and software modules in the processor 710. The software module may be located in a mature storage medium in the art, such as a random access memory, a programmable read-only memory, or an electrically erasable programmable memory, a register, etc. The storage medium is located in the memory 730. The processor 710 reads information from the memory 730 and completes the steps of the foregoing methods in combination with the hardware of the processor. To avoid repetition, details are not described herein again.

The terminal device 700 according to the embodiments of the present application may correspond to the terminal device for executing the method 200 in the above method 200 and the terminal device 500 according to the embodiments of the present application, and individual units or modules in the terminal device 700 are respectively used for executing individual actions or processing processes executed by the terminal device in the above method 200. Here, in order to avoid redundancy, detailed description thereof is omitted.

Figure 8:
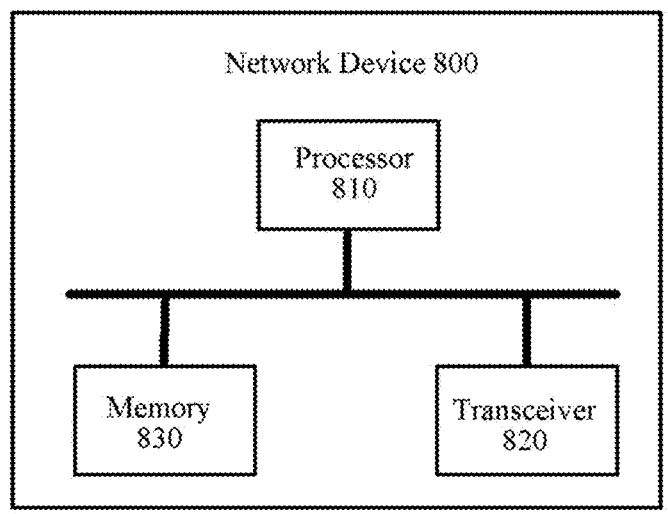
FIG. 8 is a schematic structure diagram of a terminal device according to an embodiment of the present application.

FIG. 8 is a schematic structure diagram of a network device 800 according to an embodiment of the present application. As shown in FIG. 8, the network device includes a processor 810, a transceiver 820, and a memory 830, wherein the processor 810, the transceiver 820, and the memory 830 communicate with each other through an internal connection path. The memory 830 is configured to store instructions, and the processor 810 is configured to execute the instructions stored in the memory 830 to control the transceiver 820 to receive signals or send signals.

The processor 810 is configured to determine a Resource Block Group (RBG) size under a transmission bandwidth used for data transmission with a terminal device according to a specific parameter M and the transmission bandwidth, wherein M is a positive integer.

The processor 810 is further configured to determine a target RBG for data transmission from N RBGs within the transmission bandwidth, wherein N is determined according to the transmission bandwidth and the RBG size, and N is a positive integer less than or equal to M.

The processor 810 is further configured to generate a bitmap according to the target RBG, wherein the bitmap includes M bits, and values on N bits from the M bits are used for indicating the target RBG.

The transceiver 820 is further configured to send the bitmap borne in downlink control information to the terminal device.

The transceiver 820 is further configured to transmit the data with the terminal device on the target RBG.

Therefore, the network device determines the RBG size used under the current transmission bandwidth based on the specific parameter, and uses the bitmaps with the same size to indicate the RBG when using different transmission bandwidths, so that the network device can flexibly and efficiently determine the RBG size and the blind detection complexity is reduced.

Optionally, the transmission bandwidth is equal to W, the RBG size is equal to S, and S is a minimum RBG size greater than W/M from a plurality of preset RBG sizes.

Optionally, N is equal to $\lceil W/S \rceil$, and $\lceil \ \rceil$ refers to rounding up.

Optionally, the processor 810 is further configured to: determine an M corresponding to a basic parameter set used according to the basic parameter set, wherein different basic parameter sets are corresponding to different parameters M.

Optionally, the transceiver 820 is further configured to: send first indication information for indicating M to the terminal device, wherein the first indication information includes Downlink Control Information (DCI), a Radio Resource Control (RRC) Signaling, System Information (SI) or a Media Access Control Element (MAC CE).

Optionally, the processor 810 is further configured to determine the transmission bandwidth, wherein the network device uses different transmission bandwidths to perform data transmission with the terminal device within different transmission time periods.

Optionally, the transceiver 820 is further configured to: send second indication information for indicating the transmission bandwidth to the terminal device, wherein the second indication information includes DCI, a RRC Signaling, System Information (SI) or a MAC CE.

It should be understood that, in the embodiments of the present application, the processor 810 may be a Central Processing Unit (CPU), and the processor 810 may also be other general purpose processor, a Digital Signal Processors (DSP), an Application Specific Integrated Circuit (ASIC), a Field Programmable Gate Array (FPGA), or other programmable logic device, discrete gate or transistor logic device, discrete hardware assembly, etc. The general purpose processor may be a microprocessor or the processor may be any conventional processor, or the like.

The memory 830 may include a read only memory and a random access memory, and provide instructions and data to the processor 810. A portion of the memory 830 may also include a non-volatile random access memory. In an implementation process, the steps in the foregoing methods may be completed using an integrated logic circuit of hardware or an instruction in a form of software in the processor 810. The steps of the data transmission methods disclosed with reference to the embodiments of the present application may be directly executed and accomplished by means of a hardware processor or may be executed and accomplished using a combination of hardware and software modules in the processor 810. The software module may be located in a nature storage medium in the art, such as a random access memory, a programmable read-only memory, or an electrically erasable programmable memory, a register, etc. The storage medium is located in the memory 830. The processor 810 reads information from the memory 830 and completes the steps of the foregoing methods in combination with the hardware of the processor. To avoid repetition, details are not described herein again.

The network device 800 according to the embodiments of the present application may correspond to the network device for executing the method 400 in the above method 400 and the network device 600 according to the embodiments of the present application, and individual units or modules in the network device 800 are respectively used for executing individual actions or processing processes executed by the terminal device in the above method 400. Here, in order to avoid redundancy, detailed description thereof is omitted.

Figure 9:
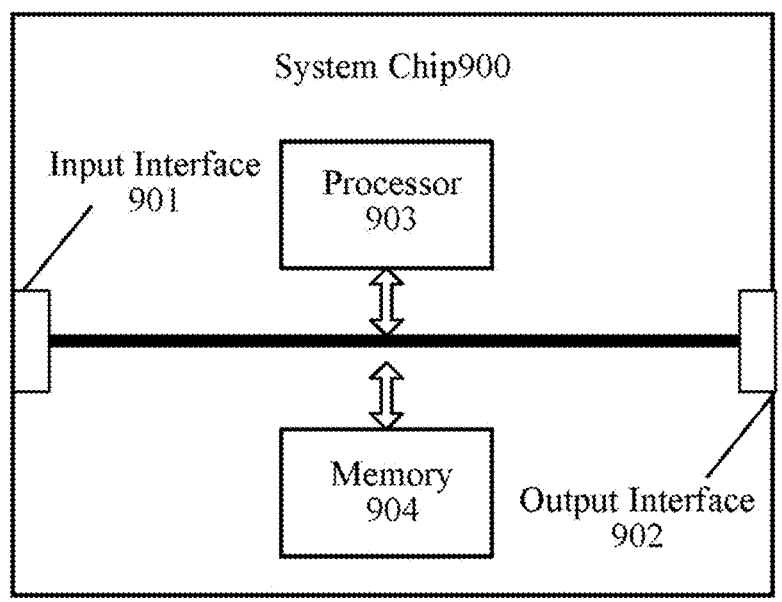
FIG. 9 is a schematic structure diagram of a system chip according to an embodiment of the present application.

FIG. 9 is a schematic structure diagram of a system chip according to an embodiment of the present application. The system chip 900 of FIG. 9 includes an input interface 901, an output interface 902, at least one processor 903 and a memory 904. The input interface 901, the output interface 902, the processor 903, and the memory 904 are connected to each other through an internal connection path. The processor 903 is configured to execute codes in the memory 904.

Alternatively, when the codes are executed, the processor 903 may implement the method 200 executed by the terminal device in the method embodiments. For the sake of brevity, details will not be described herein again.

Alternatively, when the codes are executed, the processor 903 may implement the method 400 executed by the network device in the method embodiments. For the sake of brevity, details will not be described herein again.

Those of ordinary skills in the art may be aware that, in combination with the examples described in the embodiments disclosed herein, units and algorithm steps may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of the present application.

It can be clearly understood by those skilled in the art that, for the sake of convenience and brevity, a detailed working process of the foregoing system, apparatus, and unit may refer to a corresponding process in the foregoing method embodiments, and will not be elaborated herein.

In the several embodiments provided in the present application, it should be understood that the disclosed systems, apparatuses and methods may be implemented in other ways. For example, the apparatus embodiments described above are merely illustrative. For example, the division of the units is only one logical function division. In practice, there may be another division manner. For example, multiple units or components may be combined or integrated into another system, or some features may be ignored or not executed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, may be located in one place, or may be distributed on multiple network units. Some or all of the units may be selected according to actual needs to achieve the objects of the solutions in the embodiments.

In addition, each functional unit in each embodiment of the present application may be integrated in one monitoring unit, or each unit may exist alone physically, or two or more units may be integrated in one unit.

The function may be stored in a computer-readable storage medium if being implemented in the form of a software function unit and sold or used as an independent product. Based on such understanding, the essence of the technical solutions of the present application, or the part contributing to the prior art or all or a part of the technical solutions, may be embodied in the form of a software product. The computer software product is stored in a storage medium including a number of instructions such that a computer device (which may be a personal computer, a server, or a network device, etc.) executes all or a part of steps of the method described in each of the embodiments of the present application. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely detailed embodiments of the present application, but the protection scope of the embodiments of the present application is not limited thereto. Any person skilled in the art can easily think of changes or substitutions within the technical scope disclosed by the embodiments of the present application, and all the changes or substitutions should be covered within the protection scope of the present application that is suitable for private interests. Therefore, the protection scope of the embodiments of the present application should be subjected to the protection scope of the claims.

What is claimed is:

1. A data transmission method, comprising:
determining, by a terminal device, a Resource Block Group (RBG) size corresponding to a transmission bandwidth used by the terminal device according to the transmission bandwidth and a corresponding relationship between the transmission bandwidth and the RBG size;
receiving, by the terminal device, a bitmap borne in downlink control information sent by a network device, wherein the bitmap comprises M bits, wherein M is a positive integer;
determining, by the terminal device, a target RBG for data transmission from N RBGs within the transmission bandwidth according to values on N bits from the M bits, wherein N is determined according to the transmission bandwidth and the RBG size, and N is a positive integer less than or equal to M; and
transmitting, by the terminal device, the data with the network device on the target RBG;
wherein M is determined by the terminal device according to a subcarrier spacing used by the terminal device.

2. The method according to claim 1, wherein the transmission bandwidth is equal to W, the RBG size is equal to S, and S is a minimum RBG size greater than W/M from a plurality of preset RBG sizes.

3. The method according to claim 1, wherein N is equal to ⌈W/S⌉, and ⌈ ⌉ refers to rounding up.

4. The method according to claim 1, wherein the determining, by the terminal device, the RBG size corresponding to the transmission bandwidth used by the terminal device according to the transmission bandwidth and the corresponding relationship between the transmission bandwidth and the RBG size comprises:
determining, by the terminal device, the RBG size corresponding to the transmission bandwidth used by the terminal device by looking up a table comprising the corresponding relationship between a plurality of transmission bandwidths and a plurality of RBG sizes.

5. The method according to claim 1, wherein N is a number of the RBGs comprised in the transmission bandwidth.

6. A data transmission method, comprising:
  determining, by a network device, a Resource Block Group (RBG) size corresponding to a transmission bandwidth used for data transmission with a terminal device according to the transmission bandwidth and a corresponding relationship between the transmission bandwidth and the RBG size;
  determining, by the network device, a target RBG for data transmission from N RBGs within the transmission bandwidth, Wherein N is determined according to the transmission bandwidth and the RBG size;
  generating, by the network device, a bitmap according to the target RBG, wherein the bitmap comprises M bits, and values on N bits from the M bits are used for indicating the target RBG, wherein M is a positive integer, and N is a positive integer less than or equal to M;
  sending, by the network device, the bitmap borne in downlink control information to the terminal device; and
  transmitting, by the network device, the data with the terminal device on the target RBG;
  wherein M is determined by the network device according to a subcarrier spacing used by the network device.

7. The method according to claim 6, wherein the transmission bandwidth is equal to W, the RBG size is equal to S, and S is a minimum RBG size greater than W/M from a plurality of preset RBG sizes.

8. The method according to claim 6, wherein N is equal to $\lceil W/S \rceil$, and $\lceil \ \rceil$ refers to rounding up.

9. The method according to claim 6, wherein the determining, by the network device, the RBG size corresponding to the transmission bandwidth used for data transmission with the terminal device according to the transmission bandwidth and the corresponding relationship between the transmission bandwidth and the RBG size comprises:
  determining, by the network device, the RBG size corresponding to the transmission bandwidth by looking up a table comprising the corresponding relationship between a plurality of transmission bandwidths and a plurality of RBG sizes.

10. The method according to claim 6, wherein N is a number of the RBGs comprised in the transmission bandwidth.

11. A terminal device, comprising
  a processor;
  at nsceiver; and
  a memory,
  wherein the processor communicates with the transceiver and the memory through an internal connection path, the memory is configured to store instructions, and the processor is configured to execute the instructions stored in the memory to:
  determine a Resource Block Group (RBG) size corresponding in a transmission bandwidth used by the terminal device according to the transmission bandwidth and a corresponding relationship between the transmission bandwidth and the RBG size;
  receive a bitmap borne in downlink control information sent by a network device via the transceiver, wherein the bitmap comprises M bits, wherein M is a positive integer;
  determine a target RBG for data transmission from N RBGs within the transmission bandwidth according to values on N bits from the M bits, wherein N is determined according to the transmission bandwidth and the RBG size, and N is a positive integer less than or equal to M; and
  transmit the data with the network device on the target RBG via the transceiver,
  wherein M is determined by the processor according to a subcarrier spacing used by the terminal device.

12. The terminal device according to claim 11, wherein the transmission bandwidth is equal to W, the RBG size is equal to S, and S is a minimum RBG size greater than W/M from a plurality of preset RBG sizes.

13. The terminal device according to claim 11, wherein N is equal to $\lceil W/S \rceil$, $\lceil \ \rceil$ and refers to rounding up.

14. The terminal device according to claim 11, wherein the processor is further configured to:
  determine the RBG size corresponding to the transmission bandwidth used by the terminal device by looking up a table comprising the corresponding relationship between a plurality of transmission bandwidths and a plurality of RBG sizes.

15. The terminal device according to claim 11, wherein N is a number of the RBGs comprised in the transmission bandwidth.

16. A network device, comprising:
  a processor;
  a transceiver; and
  a memory,
  wherein the processor communicates with the transceiver and the memory through an internal connection path, the memory is configured to store instructions, and the processor is configured to execute the instructions stored in the memory to:
  determine a Resource Block Group (RBG) size corresponding to a transmission bandwidth used for data transmission with a terminal device according to the transmission bandwidth and a corresponding relationship between the transmission bandwidth and the RBG size;
  determine a target RBG for data transmission from N RBGs within the transmission bandwidth, wherein N is determined according to the transmission bandwidth and the RBG size;
  generate a bitmap according to the target RBG, wherein the bitmap comprises M hits, and values on N bits from the M bits are used for indicating the target RBG, wherein M is a positive integer, and N is a positive integer less than or equal to;
  send the bitmap borne in downlink control information to the terminal device via the trasceiver; and
  transmit the data with the terminal device on the target RBG via the transceiver;
  wherein M is determined by the processor according to a subcarrier spacing used by the network device.

17. The network device according to claim 16, wherein the transmission bandwidth is equal to W, the RBG size is equal to S, and S is a minimum RBG size greater than W/M from a plurality of preset RBG sizes.

18. The network device according to claim 16, wherein N is equal to $\lceil W/S \rceil$, and $\lceil \ \rceil$ refers to rounding up.

19. The network device according to claim 16, wherein the processor is further configured to:
  determine the RBG size corresponding to the transmission bandwidth by looking up a table comprising the corresponding relati Sh p between a plurality of transmission bandwidths and a plurality of RBG sizes.

20. The network device according to claim 16, wherein N is a number of the RBGs comprised in the transmission bandwidth.

\* \* \* \* \*